United States Patent [19]

Lundy

[11] 3,955,702

[45] May 11, 1976

[54] ENCLOSED BOX-LIKE HOUSINGS

[75] Inventor: Jack W. Lundy, Wimberly, Tex.

[73] Assignee: Esquire, Inc., New York, N.Y.

[22] Filed: May 8, 1974

[21] Appl. No.: 468,201

[52] U.S. Cl. .................. 220/4 F; 52/476; 52/758 H; 220/81 R; 220/84

[51] Int. Cl.$^2$ .................. F16B 7/00; E04B 2/88; B65D 7/30; F16B 2/20

[58] Field of Search .................. 220/4 F, 84, 81; 52/476, 656, 758 H

[56] References Cited

UNITED STATES PATENTS

| | | | |
|---|---|---|---|
| 2,980,285 | 4/1961 | Parsons | 220/84 |
| 3,485,519 | 12/1969 | Chiu | 52/758 H |
| 3,517,849 | 6/1970 | Presnick | 220/84 |
| 3,528,692 | 9/1970 | Uries | 52/758 H |
| 3,579,939 | 5/1971 | Eichman | 52/476 |
| 3,606,419 | 9/1971 | Virkler | 52/758 H |
| 3,645,569 | 2/1972 | Reilly | 52/758 H |
| 3,726,551 | 4/1973 | Levenberg | 52/656 |
| 3,736,035 | 5/1973 | Brown | 52/758 H |
| 3,736,717 | 6/1973 | Farely | 52/476 |

*Primary Examiner*—George E. Lowrance
*Attorney, Agent, or Firm*—W. F. Hyer; Marvin B. Eickenroht

[57] ABSTRACT

An enclosed, box-like housing for a light fixture which is made up of a skeleton frame comprising elongate frame members having their ends connected by corner fittings to form openings between opposite pairs of the frame members, and panels held in place over the openings by elongate strips releasably connected to the frame members about the openings.

19 Claims, 8 Drawing Figures

ENCLOSED BOX-LIKE HOUSINGS

This invention relates generally to enclosed, box-like, housings for light fixtures or the like. More particularly, it relates to improvements in housings of this type which include skeleton frames having large openings about their sides which are closed by removable panels.

In a prior housing of this type, which is shown and described in U.S. Pat. No. 3,606,717, the skeleton frame is made up of elongate aluminum side and end frame members having ends which are mitered to permit them to be welded to one another, and internal flanges arranged to provide a recessed ledge about each opening for receiving a panel adapted to close the opening. When the housing is for a light fixture, as illustrated in such patent, individual panels may be opaque or light transmitting, depending on the desired effect of the fixture. In any event, the panels are held in place on the ledges by means of solid bars or strips insertable into slots formed in the frame members for wedging the panels tightly against the ledges.

Although this prior housing represents a substantial improvement over the prior art, its frame has been found to be relatively expensive to manufacture, especially in view of the ever increasing costs of aluminum. Thus, since the frame members are solid extrusions, they require a large volume of aluminum, some of which is necessarily wasted in mitering the ends of the frame members. Furthermore, the need for mitering and then welding these ends also involves a substantial amount of time and labor, which adds to the cost of manufacturing the frame.

An object of this invention is to provide a housing of this type having a frame which requires less material and which is easier to assemble than the frame of the above described prior housing.

Another object is to provide such a housing in which the frame is made from parts which are interchangeable.

A further object is to provide such a housing which is especially attractive in appearance in that its parts cooperate to provide smooth, continuous surfaces about each panel.

These and other objects are accomplished, in accordance with the illustrated embodiment of this invention, by a housing of this type having a skeleton frame which includes elongate side and end frame members which are connected at their opposite ends so that, as in the frame of the prior housing, openings are formed between opposite pairs of side and end frame members. The frame members also have flanges which, as in the case of the prior housing, provide recessed ledges about the frame opening for receiving panels for closing the openings.

However, as distinguished from the prior housing, the frame members are hollow, so as to require substantially less material, and are connected at their opposite ends to corner fittings, and thus need not be mitered for edge-to-edge connection to one another. More particularly, each corner fitting comprises a base having prongs extending from it so as to telescopically receive the ends of the frame members to be connected at each of the corners, whereby it is unnecessary to weld the ends of the frame members to one another or the corner fittings. Preferably, each of the prongs, and at least part of the base of each corner fitting, is hollow, so as to further reduce the material requirements of the frame.

The panels are removably held in place on the ledges about at least certain of the frame openings by means of strips which are releasably connected to the frame members surrounding the openings, and extend from one to the other to securely hold the panels. In the preferred and illustrated embodiment of the invention, these strips are U-shaped, thus also requiring a minimum of material, and have means on their free ends to connect with grooves in the side walls of such frame members, thereby presenting a smooth border within each recess.

The corner fittings are preferably identical in construction, and the frame members and panel holding strips are cut to length from extrusions which are identical in cross section, whereby only a minimum number of parts need be manufactured and kept in inventory. Furthermore, the corner fittings, frame members, and panel holding strips are preferably of such construction that their outer surfaces are substantially coplanar and in substantial edge-to-edge abutment, so as to present a continuous, smooth appearance.

In the drawings

Figure 1:
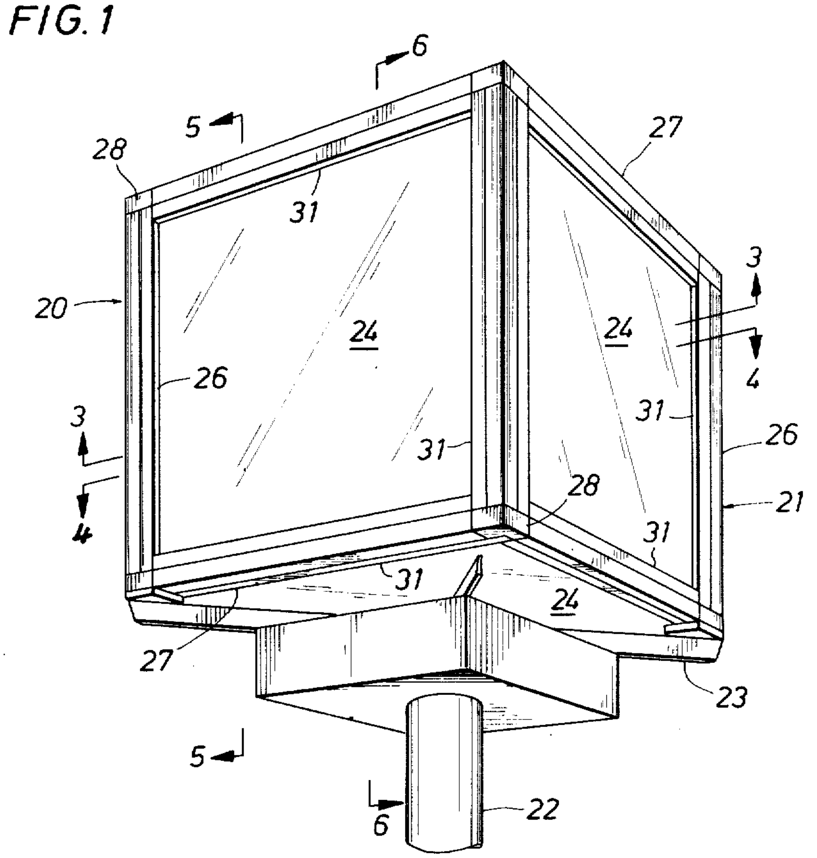
FIG. 1 is a perspective view of a light fixture having a housing constructed in accordance with the present invention, as seen from the front side and bottom thereof.
Figure 7:
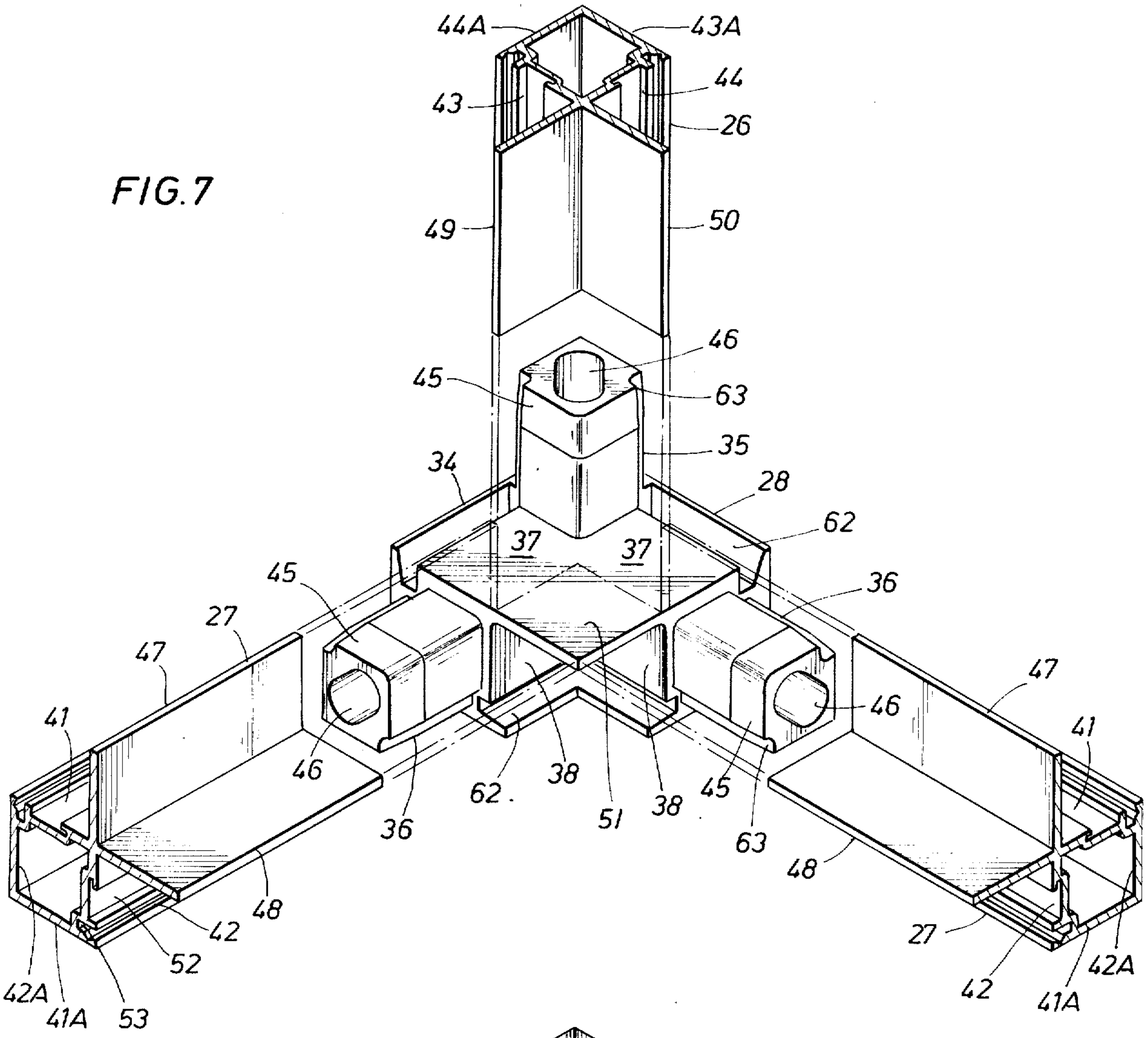
Figure 8:
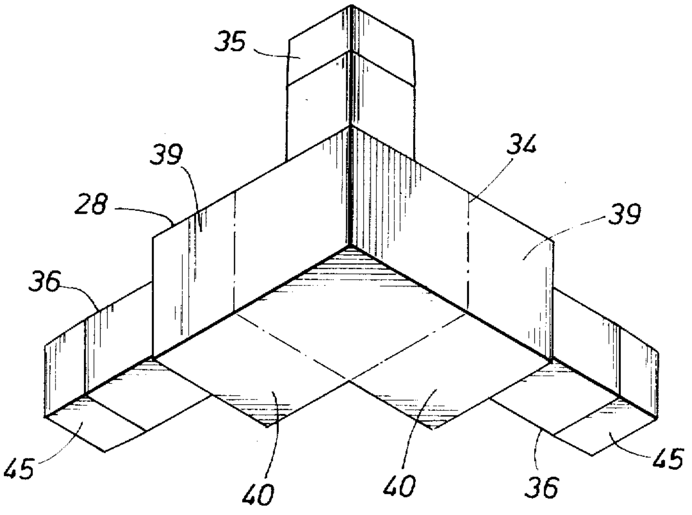

FIG. 7 is an exploded, perspective view of a corner fitting and the side and frame members connectible therewith, as seen from the inner side thereof; and FIG. 8 is a perspective view of the corner fitting as seen from the outer side thereof, With reference now to the details of the above-described drawings, the overall light fixture, which is indicated in its entirety by reference character 20, is best shown in FIG. 1 to comprise a housing 21 mounted on the upper end of a post 22 by means of a bracket 23. Although the housing 21 is shown to be generally cube-shaped, it may be of another box-like shape, such as horizontally or vertically elongate.

The housing includes a skeleton frame having elongate side frame members 26 and end frame members 27 connected at their ends by corner fittings 28 to form relatively large openings between opposite pairs of side and end frame members. Although, as in the light fixture shown in U.S. Pat. No. 3,666,934, only one opening is shown in each of its sides, the frame may instead have intermediate frame members for dividing one or more of its sides into a plurality of openings, as shown in the aforementioned U.S. Pat. No. 3,606,717.

As also shown and described in the aforementioned U.S. Pat. No. 3,666,934, the openings in the sides and the bottom end of the housing are closed by light transmitting panels 24, and the opening in the upper end is closed by an opaque panel 25. Thus, light from a light source mounted within the housing will be directed from all four sides as well as the bottom end of the fixture for lighting a relatively large area thereabout. Obviously, however, different arrangements of light transmitting and opaque panels may be used in order to provide a light fixture having other light directing patterns. Also, of course, although the housing has been found especially useful for the purpose described, it may of course be used for other purposes.

As in the housing of the light fixture of U.S. Pat. No. 3,606,717, each of the panels 24 and 25 is received on a recessed ledge about the opening in the frame it is adapted to close. Thus, as will be described in more detail to follow, ledges 29 for receiving the top and bottom panels are formed within the end frame members 27, and ledges 30 for receiving the side panels are formed within opposite pairs of side and end frame members. Each panel is of substantially the same size as the recess in which the ledge is formed, so that, as will be apparent from each of FIGS. 5 and 6, it fully closes the side opening in the frame.

Each of the light transmitting panels 24 is held in place on its ledge by means of elongate strips 31 releasably connected to the frame members surrounding the recess and extending from one to the other so as to from a border within the recess. More particularly, and as will be described to follow, the outer surfaces of the corner fittings, frame members and panel holding strips are substantially coplanar and in edge-to-edge relation so that, as illustrated in the drawings, the frame has a smooth, continuous appearance. Also, rubber gaskets 32 are fitted between each panel and the panel holding strips 31, and sealed about their outer edges with a suitable material.

Figure 2:
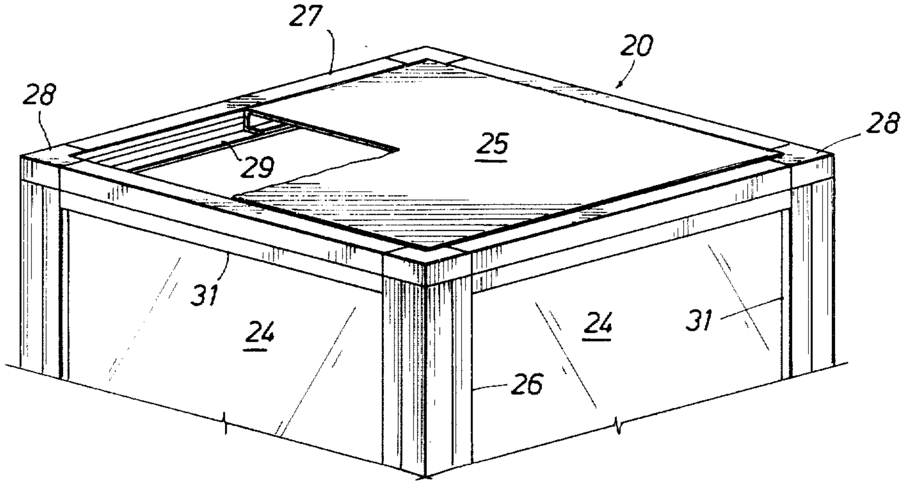
FIG. 2 is a perspective view of a portion of the light fixture, as seen from the back side and top thereof.
Figure 4:
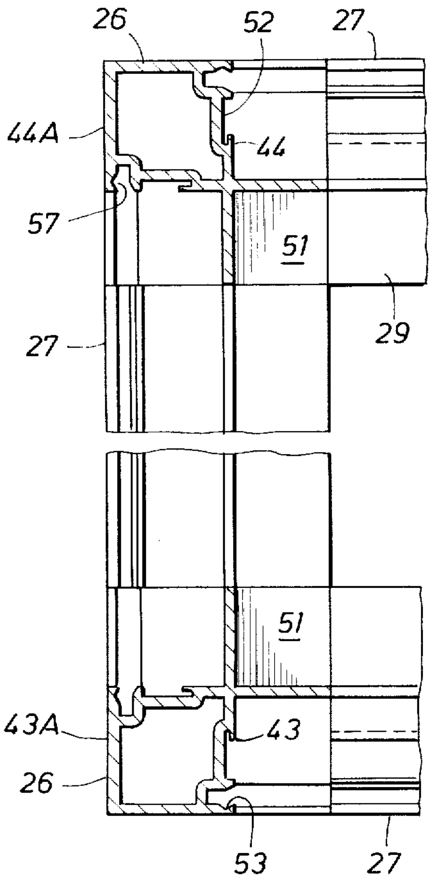
FIG. 4 is a discontinuous horizontal sectional view of another portion of the housing, as seen along broken lines 4—4 of FIG. 1, but with the panels, the panel holding strips, and the gaskets removed from the recesses in the sides of the housing.
Figure 5:
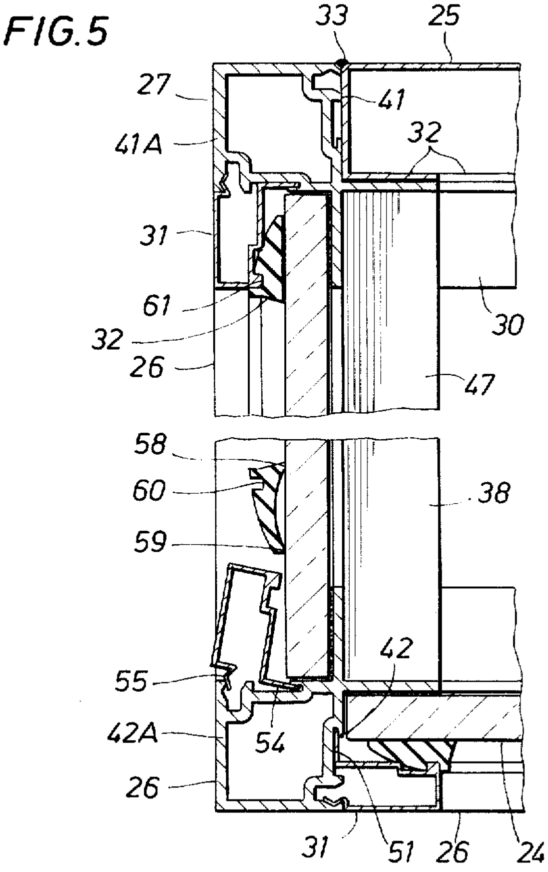
FIG. 5 is a discontinuous vertical sectional view of a portion of the housing, as seen along broken lines 5—5 of FIG. 1.
Figure 6:
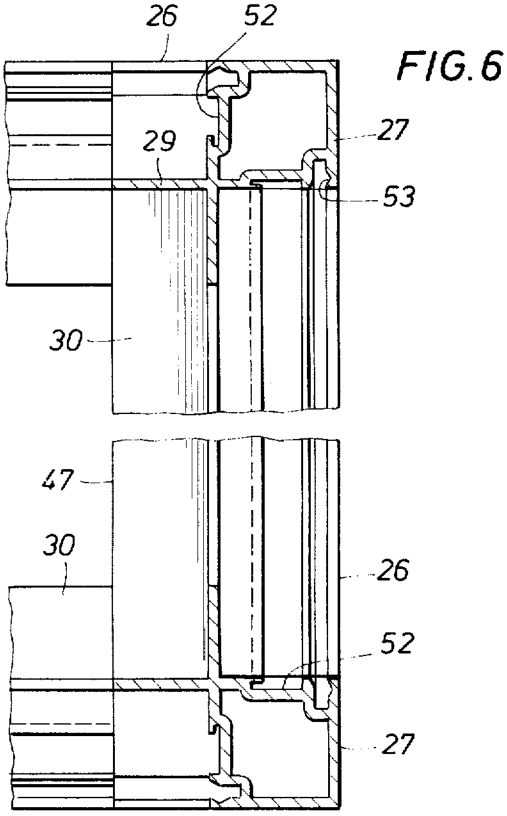
FIG. 6 is a discontinuous vertical sectional view of another portion of the housing, as seen along broken line 6—6 of FIG. 1, and with the panels, the panel holding strips and the gaskets removed the recesses in the sides thereof.

As shown in FIGS. 2 and 4, the opaque panel 25 covering the opening through the top end of the frame has an external configuration for fitting closely within the recess and a height corresponding to the depth of the recess, so that its top surface is substantially flush with the top surfaces of the end frame members 27 and end walls of the fittings 28 surrounding the recess. As best shown in FIG. 5, the panel 25 has an inturned flange 32 resting upon the ledge 29, and a weldment 33 is formed about the upper outer edge of the panel to seal off the gap between it and the adjacent end of the end walls and corner fittings at the end of the housing.

Each of the corner fittings 28 is identical and comprises an L-shaped base 34 from which a side prong 35 and a pair of end prongs 36 extend at 90° to each other, the prongs 36 being called "end" prongs inasmuch as they connect with end frame members 27, and a prong 35 being called a side prong inasmuch as it connects with a side frame member 26. As will be described in more detail to follow, the side and end frame members, which are of identical cross sections and thus may be cut to desired lengths from identical hollow aluminum extrusions, have opposite ends which fit over the prongs at each corner of the fitting. Thus, each of the frame members also extends at a right angle with respect to the other two frame members at each corner of the fitting to form the cube-shape of the housing 21.

As will be apparent from the description to follow, all of the frame members are not of the same length. However, this presents no problem since, as above-mentioned, the frame members are cut from identical extrusions. Also, since, the corner fittings 28, and thus the outer cross-sectional shapes of the prongs 35 and 36, are identical, the ends of the frame members may fit over any of the prongs of the corner fitting. In like fashion, the panel holding strips 31 are of identical U-shaped cross sections, so that they may also be cut to desired lengths from the same semi-hollow extrusion, even though, as in the case of the frame members, they are not necessarily of the same length.

As best shown in FIG. 7, the L-shaped base 34 of each corner fitting comprises a cube-shaped body from which legs extend at right angles to one another. More particularly, and as indicated by the broken lines in FIGS. 7 and 8, the legs extend from adjacent side walls of the cube-shaped body and are of generally the same cross-sectional area as the cube-shpaed body so that their side walls form continuations of the corresponding walls of such body. Thus, with reference to FIG. 7, each leg has a pair of inner walls 37 and 38 and, as shown in FIG. 8, a pair of outer walls 39 and 40, the inner walls 37 being continuous of the top end wall of the body, the inner walls 38 forming continuations of the inner side walls of the body, the outer walls 39 forming continuations of the outer walls of the body, and the outer walls 40 forming continuations of the lower end wall of the body.

As shown in FIG. 7, each of the end prongs 36 is of less outer cross-sectional area than the end wall of the leg from which it extends, and has side walls spaced inwardly from the side walls of such leg. In like manner, the prong 35 is of less outer cross-sectional area than the top end wall of the body of the base, and has side walls spaced inwardly from the outer and inner sides of such body. In this way, when the ends of the hollow frame members are received over the ends of the prongs, they abut with the end walls from which the prongs extend, and their side walls form substantial continuations of the side walls of the leg and body from which the prongs extend. Thus, the outer side walls 41A and 41B of the frame members 27 form smooth continuations of the outer side walls 40 and 39, respectively, of the legs of the fitting, and the inner side walls 41 and 42 form smooth continuations of the inner side walls 37 and 38, respectively, of the legs. At the same time, the outer walls 43A and 44A of the frame member 26 form smooth continuations of the outer side walls of the body of the base, and the inner walls 43 and 44 thereof form smooth continuations of the inner side walls of such body.

It is of course desirable that the ends of the frame members fit as tightly as possible over the prongs of the corner fittings. For this purpose, each prong has a base portion adjacent the leg and body from which it extends having an outer cross-sectional shape slightly larger than the inner cross-sectional shape of the frame member to be received thereover. The outer ends of the prongs have walls 45, which taper inwardly to outer ends which are of slightly smaller cross-sectional area than those within the frame members, so that as the ends of the frame members are moved onto the prongs, they will actually be expanded outwardly onto the base portion of each prong.

As shown in FIG. 7, a hole 46 is formed in the end of each prong to extend throughout the length thereof, and, in the case of the end prongs 36, throughout at least a substantial portion of the length of the legs from which they extend. Preferably, the openings 46 extend further into the body from which the side prong 35 and the legs extend so as to at least substantially intersect one another at a central point in the body. In this way, the fittings as well as the frame members require a minimum of material. As will be understood to those skilled in the art, the fittings may be cast from aluminum in accordance with generally conventional practices.

As best shown in FIGS. 1 and 2, each of the corner fittings 28 is disposed with its end prongs 36 extending in a substantially horizontal direction. Since these prongs extend from legs, which form the ends of the L-shaped base of each fitting, the end frame members 27 extending between the prongs 36 will be shorter than the side frame members extending between the side prongs 35, although, as previously mentioned, this presents no problems in manufacturing the frame. As shown in the illustrated embodiment of the invention, the strips 31 are also of unequal lengths, with certain of them being of the same length as the side frame members along which they extend, and others being of the same length as the end frame members being along which they extend, whereby the opposite ends of the shorter strips 31 extend between the sides of the longer strips. Here again, however, there is no problem in using strips of unequal lengths, whether due to the arrangement described, or due to frame openings of other than square shape, because all such strips may be cut from the same extrusion. Furthermore, since, in the illustrated embodiment of the invention, the openings formed between the frame members are square, each of the panel holding strips 31 may, if desired, be of equal length, with the end of each extending from the side of another.

Flanges 47 and 48 extend along the inner side walls 41 and 42, respectively, of each end frame member 27, and flanges 49 and 50 extend along the inner side walls 43 and 44, respectively, of the side frame members 26. More particularly, and as shown, these flanges extend at right angles to one another from the inner corners of each of the frame members, and provide substantial continuations of the adjacent inner sides of each frame member. A flange 51 also extends from the upper ends of and perpendicular to the inner side walls 38 of each leg. More particularly, the edges of the flange 51 are substantial continuations of the end walls of the legs from which the prongs 36 extend, so that the flange is of generally the same surface area as the cross-sectional area of the body from which the legs extend, and the flanges 47, 49 and 50 are of the same width as one another and the flange 51.

Thus, when the end frame members 27 are assembled on the prongs 36, their flanges 48 will abut and be substantially aligned with the flange 51 on the corner fitting, whereby the flanges on the four corner fittings and four frame members defining certain openings in the frame form a continuous ledge having a generally coplanar top surface for receiving a panel. In like manner, when the side frame member 26 is assembled on the side prong 35, its flanges 49 and 50 will abut and be aligned with the flanges 47 of the end frame members, whereby the flanges 47, 49 and 50 of the four frame members defining other openings in the frame form a continuous ledge thereabout having a generally coplanar surface for receiving a panel. These substantially continuous ledges not only provide firm foundations for the panels, but also facilitate closing off the interior of the housing from the exterior thereof in dustproof fashion.

The outer face of each inner wall of each of the frame members is provided with a pair of longitudinal grooves for releasably connecting with means on the free ends of the generally, U-shaped panel holding strips 31. These grooves include a relatively shallow groove 52 formed in an intermediate portion of each side wall, and a relatively deep groove 53 formed between the shallow groove and the outer edge of the side wall. Each strip 31, on the other hand, has an outwardly extending flange 54 on one end for fitting within the groove 52, and an L-shaped flange 55 on the other end for fitting within the groove 53. As best shown in FIGS. 3 to 6, the flange 54 is of a width just less than the width of the shallow groove 52, so that its outer end may be moved sidewise into an undercut portion of the groove and then swung in a counterclockwise direction, as shown in FIG. 5, to engage flange 55 with the groove 53. For this purpose, flange 55 has an outwardly bent ridge 56 which is adapted to be cammed inwardly over the outer edge of the groove 53, as the flange 55 is moved into the groove, to permit it to snap into a slot 57 formed in the outer side of the groove 53.

As previously described, and as shown in FIGS. 3 to 6, the space between the inner side of each strip 31 and the oppositely facing outer side of each panel 24 is closed by means of a gasket 32. As shown in FIG. 5, when unstressed, the gasket is bent in an arc between its inner end 58 and its outer end 59. However, when the gasket is moved into the space, its ends are compressed to cause the gasket to flatten and thereby fit tightly within the space. The gasket is retained within the space by means of a groove 60 on its outer side which is adapted to fit over a bead 61 on the inner side of one leg of the strip 31. As shown in FIGS. 3 to 6, the inwardly facing end of the gasket 32 forms a smooth transition between the ends of the seal strip and the adjacent surface of the panel, which is later coated with a suitable sealing material.

As best shown in FIG. 7, each of the legs of the base 34 of each corner fitting 28 is provided with a pair of grooves 62 which are of generally the same shape and aligned with the deep groove 53 in the side walls of each of the end frame members 27 connected to the legs. Each groove 62 is thus in a position to receive the ends of the flange 55 of a panel holding strip 31, in the event the strip is of a length which extends from one side of the frame member to the other. As also shown in FIG. 7, two corners of each of the end prongs are recessed at 63 adjacent the portions of the inner sides of the deep grooves 53 formed in the side walls of the frame members received over the prongs, and the openings 46 are formed on an angle which extends generally intermediate these recesses.

Figure 3:
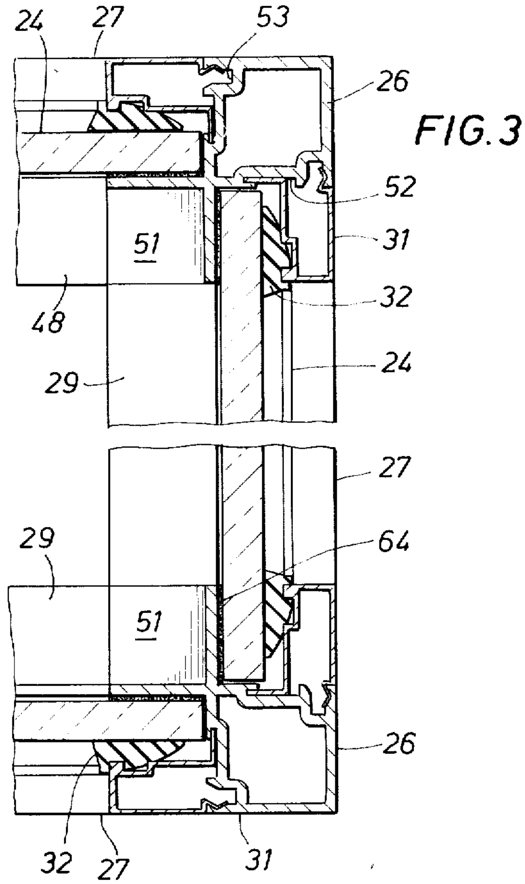
FIG. 3 is a discontinuous horizontal sectional view of a portion of the housing of the fixture, as seen along broken lines 3—3 of FIG. 1.

As indicated in FIGS. 3 and 5, strips 64 of sealing material are laid over the flanges forming the recessed legs on which the panels are disposed, preferably just prior to assembly of the panels. Then, after the panels have been placed on the ledges, the panel holding strips 31 have been connected to the frame members, and the gaskets 32 are in place, the inner sides of the panels are held in sealed engagement with the strips 64 to close off the interior of the housing.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an enclosed, box-like housing for a light fixture or the like, which includes a skeleton frame including hollow, elongate side and end frame members, and corner fittings connecting each side frame member with a pair of end frame members, so as to form openings between opposite pairs of side and end frame members, and panels for closing the openings, the improvement comprising each corner fitting including a base having a body, and a pair of legs extending from adjacent sides of the body, a side prong extending perpendicularly from a side of the body adjacent the legs and telescopically received within the open end of a side frame member, and an end prong extending perpendicularly from the end of each leg, and thus perpendicularly to one another as well as the side prong, and telescopically received within the open end of an end frame member, each frame member having flanges which are coextensive of its length and which have end edges flush with the end edges of the frame member and perpendicular to the length thereof, and a flange extending from the legs of the base of each corner fitting and having edges which are flush with the ends of the legs and perpendicular to the length thereof, the end edges of one flange on each end frame member substantially abutting the side edge of a flange of a side frame member, the end edges of the other flange on each end frame member substantially abutting one edge of the flange on said legs, and the end edges of the flanges of each side frame member substantially abutting the sides of the legs of the base from which said flange extends, so as to provide recessed ledges substantially continuously about the openings in the frame on which the panels may be received.

2. In a housing of the character defined in claim 1, wherein said prongs and said frame members are respectively of identical outer and inner cross-sectional shapes.

3. In a housing of the character defined in claim 1, wherein the outer surfaces of the bases of the corner fittings and the frame members are substantially coplanar and in substantial edge-to-edge abutment.

4. In a housing of the character defined in claim 3, wherein at least some of said panels are held in place on the ledges by elongate strips releasably connected to the side walls of the frame members disposed about the recess in which the panel is received, and extending lengthwise from one to another to form a substantially continuous border within the said outer surfaces.

5. In a housing of the character defined in claim 4, wherein the outer surfaces of the strips are substantially coplanar and in substantial edge-to-edge abutment with those of the bases of the fittings and the frame members.

6. In a housing of the character defined in claim 4, including rubber gaskets extending longitudinally between each strip and the panel held thereby, each strip having a groove therein, and each gasket having a bead therealong fitting within the groove to hold it in place.

7. In a housing of the character defined in claim 6, including seal strips extending about the flanges forming the ledges for engaging the inner edges of the panels supported thereon.

8. In a housing of the character defined in claim 1, wherein the prongs are hollow.

9. In a housing of the character defined in claim 8, wherein at least a portion of the base of each fitting is hollow.

10. In a housing of the character defined in claim 1, wherein each corner fitting is a single casting.

11. In a housing of the character defined in claim 1, wherein the open ends of the frame members have a swage fit over the prongs.

12. In a housing of the character defined in claim 1, wherein the frame members have identical cross-sectional shapes.

13. In an enclosed, box-like housing for a light fixture or the like, which includes a skeleton frame including elongate side and end frame members which are hollow, and corner fittings connecting each side frame member with a pair of end frame members, so as to form between opposite pairs of side and end frame members, and panels for closing the openings, the improvement comprising each corner fitting including a base having a cube-shaped body having opposite end walls, and adjacent pairs of inner and outer side walls, first and second legs extending perpendicularly from the inner side walls of the body, each leg having inner walls which form substantial continuations of one end wall and one inner side wall, respectively, of said body, an end wall perpendicular to the inner walls, and a flange extending from one inner wall of the legs to provide a substantial continuation of the other inner wall of the legs, and having outer edges which form substantial continuations of the end walls of the legs, first and second prongs extending perpendicularly from said end walls of the first and second legs, respectively, and thus with respect to one another, and having side walls which are spaced inwardly from the side walls of the legs, a third prong extending perpendicularly from said one end wall of the body, and thus with respect to the first and second prongs, and having side walls which are spaced inwardly from the side walls of said body, the ends of said pair of end frame members being telescopically received over the side walls of the first and second prongs so as to substantially abut the end walls of the legs from which the prongs extend, the end of said side frame member being telescopically received over the side walls of the third prong so as to substantially abut the end wall of the body from which said third prong extends, and said end frame members having first flanges which form substantial continuations of the flange on the legs of the base, and second flanges which form substantial continuations of flanges on said side frame members, the flanges on each frame member being coextensive of the length of the frame member and having end edges flush with the ends of the frame member and perpendicular to the length thereof, the end edges of one flange on each end frame member substantially abutting the side edge of a flange of a side frame member, the end edges of the other flange on each end frame member substantially abutting one edge of the flange on said legs, and the end edges of the flanges of each side frame member substantially abutting the sides of the legs from which said flange extends, whereby the outwardly facing surfaces of the flanges on the bodies and frame members thereby form recessed ledges substantially continuously about the openings in the frame on which the panels may be received.

14. In a housing of the character defined in claim 13, wherein the outer surfaces of the body and legs of the bases of the corner fittings and the frame members are substantially coplanar.

15. In a housing of the character defined in claim 13, wherein the prongs are hollow.

16. In a housing of the character defined in claim 15, wherein at least a portion of the legs and body of the base of each fitting is hollow.

17. In a housing of the character defined in claim 13, wherein each corner fitting is a single casting.

18. In a housing of the character defined in claim 13, wherein the side walls of the prongs taper inwardly toward their outer ends and have a swage fit within the frame members.

19. In a housing of the character defined in claim 13, wherein the frame members have identical cross-sectional shapes.

* * * * *